(12) United States Patent
Haltiner, Jr. et al.

(10) Patent No.: US 7,597,986 B2
(45) Date of Patent: Oct. 6, 2009

(54) METHOD AND APPARATUS FOR GASKETING A FUEL CELL

(75) Inventors: Karl J. Haltiner, Jr., Fairport, NY (US); Gary F. Reisdorf, Penfield, NY (US)

(73) Assignee: Delphi Technologies, Inc., Troy, MI (US)

(*) Notice: Subject to any disclaimer, the term of this patent is extended or adjusted under 35 U.S.C. 154(b) by 99 days.

(21) Appl. No.: 11/714,450

(22) Filed: Mar. 6, 2007

(65) Prior Publication Data

US 2007/0160891 A1    Jul. 12, 2007

Related U.S. Application Data

(62) Division of application No. 10/607,609, filed on Jun. 27, 2003, now Pat. No. 7,217,300.

(51) Int. Cl.
- *H01M 2/00* (2006.01)
- *H01M 2/02* (2006.01)
- *H01M 2/08* (2006.01)

(52) U.S. Cl. .............. 429/34; 429/35; 429/36

(58) Field of Classification Search ............ 429/34, 429/35, 36

See application file for complete search history.

(56) References Cited

U.S. PATENT DOCUMENTS

| | | | |
|---|---|---|---|
| 5,532,073 A * | 7/1996 | Hirata et al. ............... | 429/34 |
| 5,750,279 A | 5/1998 | Carolan et al. | |
| 6,797,425 B2 * | 9/2004 | Blanchet ..................... | 429/37 |

FOREIGN PATENT DOCUMENTS

| | | |
|---|---|---|
| DE | 198 05 142 | 8/1999 |
| EP | 02/20143 | 3/2002 |
| EP | 1 298 755 | 4/2003 |
| EP | 1 325 774 | 7/2003 |
| EP | 2004/030121 | 4/2004 |

\* cited by examiner

*Primary Examiner*—Patrick Ryan
*Assistant Examiner*—Julian Mercado
(74) *Attorney, Agent, or Firm*—Paul L. Marshall

(57) ABSTRACT

In a solid-oxide fuel cell assembly comprising a plurality of components having electrically-conductive mating surfaces therebetween, the surfaces are sealed by gasket elements that include first and second silver braze alloy layers and a dielectric layer, formed preferably of yttrium-stabilized zirconia (YSZ), disposed between the alloy layers. The alloy is capable of bonding to many ceramics, including YSZ, and is readily brazed to the oxide layer formed on many metals at elevated temperatures. Because the braze alloy is electrically conductive, a dielectric layer must be included to break conductivity in bonding applications where electrical insulation is required. YSZ functions as a reliable insulator and will not crystallize or fracture as do prior art glass insulators. The assembly is useful as an auxiliary power unit in a vehicle.

6 Claims, 1 Drawing Sheet

METHOD AND APPARATUS FOR GASKETING A FUEL CELL

This application is a divisional application of U.S. application Ser. No. 10/607,609, filed Jun. 27, 2003 now U.S. Pat. No. 7,217,300.

TECHNICAL FIELD

The present invention relates to fuel cells; more particularly, solid-oxide fuel cell assemblies which operate at elevated temperatures; and most particularly, to gasket material for sealing joints between components of such fuel cell assemblies.

BACKGROUND OF THE INVENTION

Fuel cells for combining hydrogen and oxygen to produce electricity are well known. A known class of fuel cells includes a solid oxide electrolyte layer through which oxygen anions migrate; such fuel cells are referred to in the art as "solid-oxide" fuel cells (SOFCs).

In some applications, for example, as an auxiliary power unit (APU) for an automotive vehicle, an SOFC stack assembly is preferably fueled by "reformate" gas, which is the effluent from a catalytic gasoline oxidizing reformer. Reformate typically includes amounts of carbon monoxide (CO) as fuel in addition to molecular hydrogen. The reforming operation and the fuel cell operation may be considered as first and second oxidative steps of the liquid hydrocarbon, resulting ultimately in water and carbon dioxide. Both reactions are exothermic, and both are preferably carried out at relatively high temperatures, for example, in the range of 700° C. to 900° C.

A complete fuel cell stack assembly comprises a plurality of components and sub-assemblies joined together mechanically to provide the desired flow paths and control pathways for the liquid hydrocarbon, reactive gases, spent gases, and cooling gases. It is essential that the joints or interfaces between the components and sub-assemblies be durably leak-free at temperatures from below 0° C. to as high as at least 900° C., at pressures from subatmospheric to up to several atmospheres. Such conditions place very high demands on materials selected for gaskets at these joints and interfaces.

It is known to use various glass and ceramic compositions as sealants. These sealants are also useful as dielectric insulators between adjacent cell elements, such as for example anode plates and cathode plates, which operate at different voltage potentials. However, a drawback is that such sealants, though effective, tend to be quite brittle and are easily fractured in assembly, transportation, or use. When such a fuel cell assembly is used in a relatively high vibrational environment, for example, as an auxiliary power unit (APU) in a land vehicle, the environmental vibration may be sufficient to cause the seals to crack.

Typically, glass seals require high-temperature sintering during manufacture of a fuel cell system, during which the glass devitrifies and flows to fill the interface between the components to bond and seal them. This seal can function satisfactorily until the stack assembly is thermally cycled. Because of differences in the coefficients of thermal expansion (CTE) of the components and the glass seals, and because the glass may progressively crystallize, the seal may fracture, resulting in gas leakage and failure of the fuel cell stack assembly. As the leak increases progressively, cell output diminishes until the total voltage output is unacceptably low.

What is needed is a material for gasketing in an SOFC system which is thermally stable over the range between shutdown and operating temperatures for both the reformer and the fuel cell assembly; which is chemically stable in oxidizing and reducing environments; which is acceptably rugged for assembly and operation of the system; which can provide a dielectric function; and which is compatible with other materials of the system.

It is a principal object of the present invention to provide an improved material for gasketing joints and seals in a fuel cell assembly.

SUMMARY OF THE INVENTION

Briefly described, in a solid-oxide fuel cell assembly comprising a plurality of components having electrically-conductive mating interfaces therebetween, the component surfaces are sealed by gaskets that include a silver braze alloy and a layer of yttrium-stabilized zirconia (YSZ) disposed within the alloy. The alloy is capable of bonding to many ceramics, including YSZ, and is readily brazed to the oxide layer formed on many metals at elevated temperatures. Because the braze alloy is electrically conductive, a dielectric layer must be included to break conductivity in bonding applications where insulation is required. YSZ functions as a reliable insulator and will not crystallize or fracture as does glass.

BRIEF DESCRIPTION OF THE DRAWINGS

These and other features and advantages of the invention will be more fully understood and appreciated from the following description of certain exemplary embodiments of the invention taken together with the accompanying drawing, in which.

DESCRIPTION OF THE PREFERRED EMBODIMENTS

Figure 1:
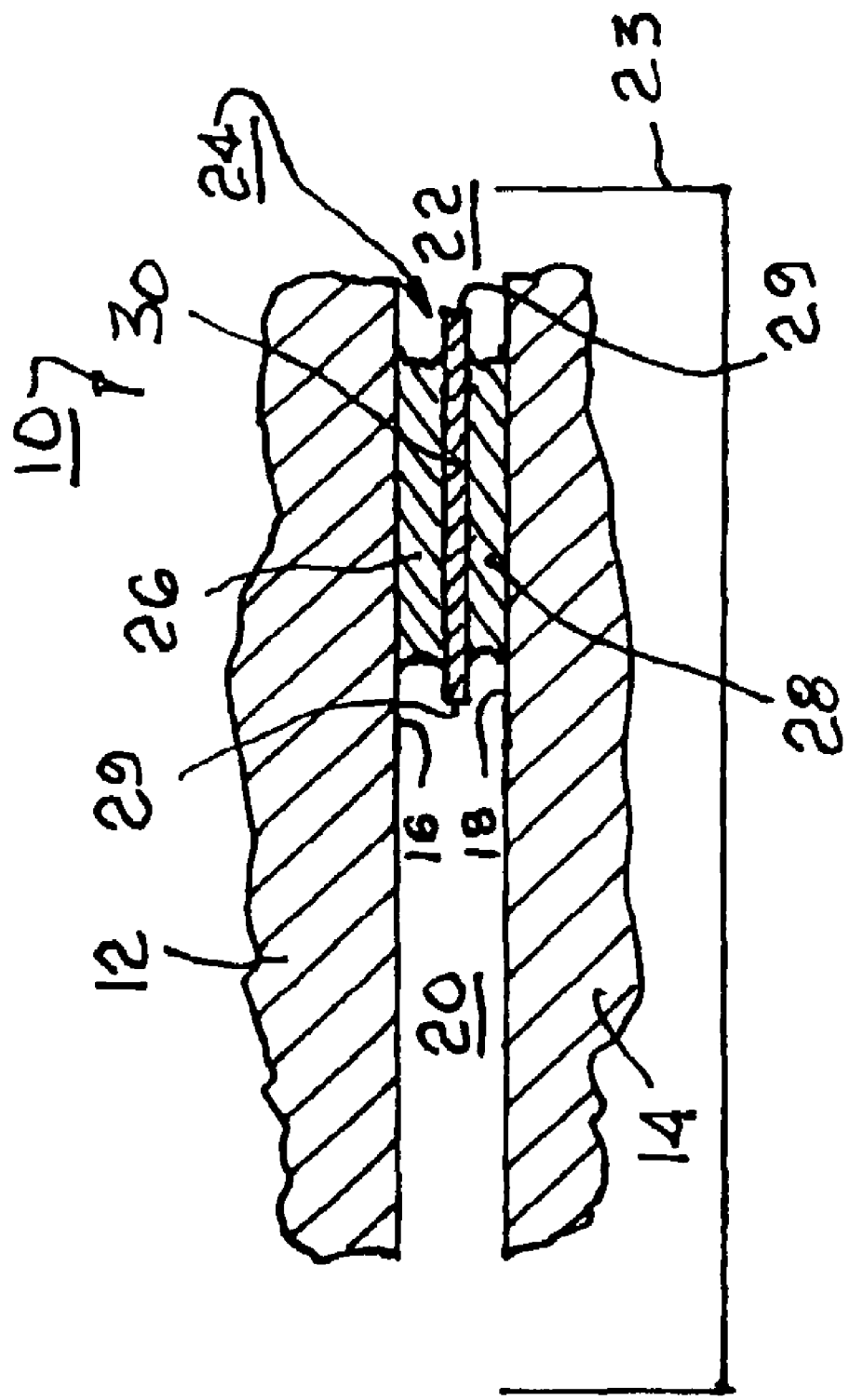
FIG. 1 is an elevational cross-sectional view of a portion of a fuel cell stack assembly having gasketing in accordance with the invention, the assembly being suitable for use as an auxiliary power unit in a vehicle.

Referring to FIG. 1, fuel cell stack assembly 10 includes first and second fuel cell elements 12,14 formed for mating along respective surfaces 16,18. A first space 20 between elements 12, 14 is for passage of gas within assembly 10. Surfaces 16,18 must be sealed to prevent leakage of gas from space 20 to the exterior 22 of the assembly. Assembly 10 may be suitably employed as an auxiliary power unit in a vehicle 23.

A gasket element 24 is disposed between surfaces 16 and 18 for providing such a hermetic seal. Element 24 comprises a first layer 26 of a braze alloy sealingly disposed against surface 16 and a second layer 28 of a braze alloy sealingly disposed against surface 18. The alloys in layers 26,28 preferably contain silver. Between alloy layers 26,28 is a dielectric element 30 for electrically insulating alloy layer 26 from layer 28. Dielectric element 30 is preferably formed of yttrium-stabilized zirconia having a thickness of about 100 µm. In addition to being an excellent insulator, YSZ has a CTE approximating that of fuel cell elements 12,14 which may be formed from, for example, 430 stainless steel having a CTE of $12.9 \times 10^{-6}/°$ C. CTE differences may be further reduced by addition of magnesia to the YSZ in known fashion. Obviously, other ceramics having the appropriate insulative and thermal properties may be substituted for YSZ.

Silver braze alloys are known in the metallurgical arts for withstanding vibration without work hardening and are also capable of yielding without fracture at elevated temperatures. The melting temperature of silver being about 960° C., such alloys are well-suited to fuel cell operating temperatures in the range of 750° C.

In a currently preferred method for forming gasket element 24:

a) a dielectric element 30 is formed in the general shape of the surfaces to be gasketed, as by die cutting from a sheet of YSZ, the shape being preferably slightly oversized to prevent accidental joining of braze layers 26,28 around the edges 29 of YSZ cutouts;

b) a paste is formed including powdered silver braze in the size range of about 10 μm and a non-flux fluid carrier, such as A149-19-15, available from Ferro Corporation, Cleveland, Ohio, USA;

c) a screen is formed in the appropriate shape of the braze layers to be formed;

d) the paste is applied by screen printing in an appropriate thickness either to surfaces 16 and 18 or to the surfaces of dielectric element 30;

e) the components are assembled as shown in FIG. 1; and f) the assembly is sintered in an atmospheric furnace at a temperature above the melting point of the braze alloy, whereby the braze alloy is liquefied and upon cooling becomes bonded to element surfaces 16,18 and to dielectric element 30.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A fuel cell stack assembly comprising first and second components, said first component having a different voltage potential than said second component, wherein at least one joint between said first and second components is sealed by a gasketing element, said gasketing element including a first alloy layer, a second alloy layer, and a dielectric element, wherein said first alloy layer is bonded to said first component, said second alloy layer is bonded to said second component, and said dielectric element is disposed between said first and second alloy layers, wherein said dielectric element is in contact with said first and second alloy layers, and wherein said dielectric element electrically insulates said first component from said second component.

2. A fuel cell stack assembly in accordance with claim 1 wherein at least one of said first and second alloy layers is formed by brazing of a chemical composition.

3. A fuel cell stack assembly in accordance with claim 1 wherein at least one of said first and second alloy layers is a braze alloy including silver.

4. A fuel cell stack assembly in accordance with claim 1 wherein said dielectric element is formed of yttrium-stabilized zirconia.

5. A fuel cell stack assembly in accordance with claim 1 wherein said first and second components are components of a solid oxide fuel cell assembly.

6. A fuel cell stack assembly in accordance with claim 1 wherein said assembly is an auxiliary power unit for a vehicle.

\* \* \* \* \*